United States Patent
Myrholt et al.

(10) Patent No.: US 6,415,883 B1
(45) Date of Patent: Jul. 9, 2002

(54) DEPLOYABLE A-PILLAR COVERS FOR PEDESTRIAN PROTECTION

(75) Inventors: Helge Myrholt, Molndal; Mattias Ericsson, Varberg, both of (SE)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/683,606

(22) Filed: Jan. 24, 2002

(51) Int. Cl.[7] ............................................. B60R 21/34
(52) U.S. Cl. ................. 180/274; 180/271; 180/69.21; 296/96.2; 296/189
(58) Field of Search ........................... 180/69.2, 69.21, 180/271, 274; 280/748, 751, 753; 296/96.2, 189

(56) References Cited

U.S. PATENT DOCUMENTS

| | | | |
|---|---|---|---|
| 4,249,632 A | | 2/1981 | Lucchini et al. |
| 4,518,197 A | | 5/1985 | Gallitzendorfer et al. |
| 4,657,105 A | * | 4/1987 | Miyada ................... 180/274 |
| 5,118,157 A | | 6/1992 | Tamura |
| 5,794,975 A | | 8/1998 | Nohr et al. |
| 5,938,267 A | * | 8/1999 | Schurig ................... 296/96.2 |
| 6,145,921 A | * | 11/2000 | Cho ......................... 280/751 |
| 6,182,782 B1 | | 2/2001 | Matsuura et al. |
| 6,293,362 B1 | * | 9/2001 | Sasaki et al. ............. 180/274 |

FOREIGN PATENT DOCUMENTS

| | | | |
|---|---|---|---|
| DE | 198 03 165 A1 | * | 7/1999 |
| JP | 7-108903 A | * | 4/1995 |
| JP | 7-156749 A | * | 6/1995 |
| JP | 10-217903 A | * | 8/1998 |

* cited by examiner

Primary Examiner—Lanna Mai
Assistant Examiner—Ruth Ilan
(74) Attorney, Agent, or Firm—Gary A. Smith

(57) ABSTRACT

A pedestrian protection apparatus for a motor vehicle includes left and right A-pillar covers hingingly attached to respective A-pillars. The A-pillar covers have a retracted condition wherein they lie close to respective vehicle A-pillars, and are movable to a deployed condition wherein they are spaced forwardly from the respective A-pillars. In the deployed condition, the A-pillar covers are able to deform and/or move rearward when struck by a pedestrian so as to absorb impact energy and thereby lessen the likelihood and/or severity of injury, as compared with direct impact with a conventional, stationary A-pillar. An actuator system includes a contact or non-contact sensor for indicating an actual or imminent collision with a pedestrian, and pyrotechnic devices that urge the A-pillar covers to the deployed condition prior to a pedestrian impact with the A-pillar covers. The hood and/or windshield may also deploy to a pedestrian-friendly position in conjunction with deployment of the A-pillar covers.

20 Claims, 2 Drawing Sheets

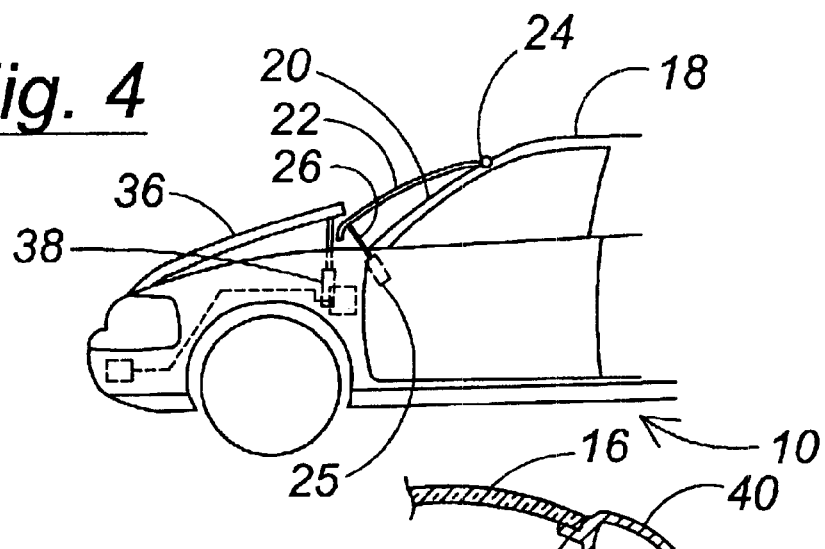
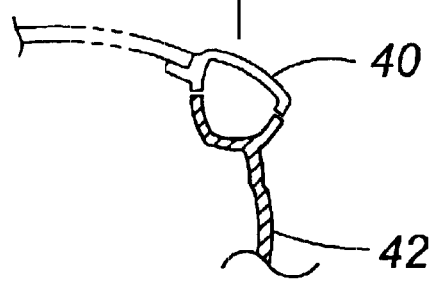
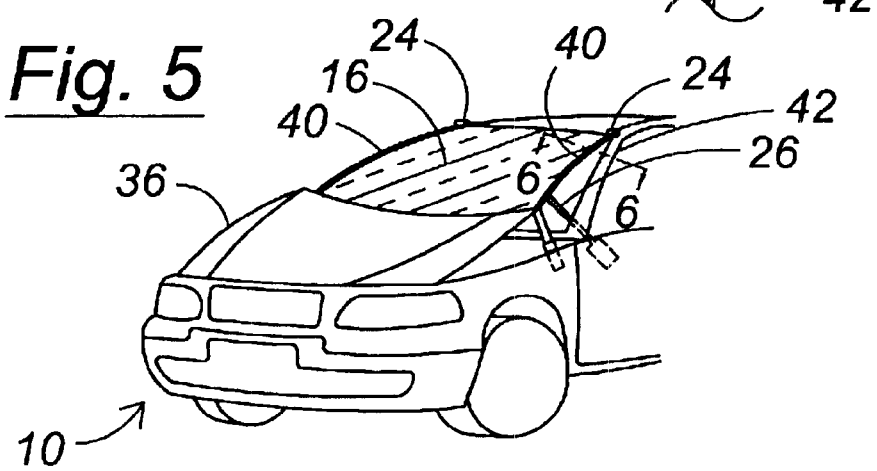

DEPLOYABLE A-PILLAR COVERS FOR PEDESTRIAN PROTECTION

BACKGROUND OF INVENTION

The present invention relates generally to devices for reducing injury to pedestrians when struck by a vehicle, and more specifically to an apparatus and method for reducing the severity and likelihood of injury caused by impact between a pedestrian and a vehicle's A-pillars.

It is an objective of current vehicle design to reduce the likelihood and/or severity of injury to pedestrians that may be struck by a vehicle. Most proposals to achieve this reduction have focused on increasing the energy absorbing characteristics of the bumper/grille area of the vehicle or the hood. Among the proposed devices are airbags mounted at various external locations on the vehicle and deployable hoods that are raised upward prior to the impact to provide additional crush space between the hood and objects in the engine compartment.

In vehicle/pedestrian collisions in which the pedestrian is thrown over or onto the vehicle hood, impact of the pedestrian with one of the vehicle's A-pillars can be a significant source of injury. The A-pillars are the structural members of the vehicle body that extend upward and rearward from the rear of the fenders to the forward outboard corners of the roof, along either side of the windshield. The A-pillars must be quite strong to support the roof and the windshield during normal vehicle operation and during a rollover accident. As a result, the A-pillars must be quite rigid, and it is difficult to design the A-pillars to absorb a significant amount of impact energy when struck by a pedestrian.

SUMMARY OF INVENTION

The present invention provides a pedestrian protection apparatus for a motor vehicle having a hood, a windshield, and left and right A-pillars disposed adjacent left and right ends of the windshield respectively. The apparatus comprises left and right A-pillar covers having a retracted condition wherein they are adjacent the respective A-pillars, and movable to a deployed condition wherein the A-pillar covers are spaced forwardly from the respective A-pillars. An actuator system operates to move the A-pillar covers from the retracted condition to the deployed condition prior to a pedestrian impact with the A-pillar covers. In the deployed condition, the A-pillar covers are able to move rearwardly when struck by a pedestrian so as to absorb impact energy and thereby lessen the likelihood and/or severity of injury, as compared with the case where the pedestrian strikes a conventional, stationary A-pillar.

In a preferred embodiment of the invention, upper ends of the A-pillar covers attached to the respective A-pillars by hinges such that the A-pillar covers rotate about their upper ends to move from the retracted condition to the deployed condition. This results in the lower ends of the A-pillar covers being able to travel a longer distance rearward, and thus absorb a greater amount of impact energy. This is advantageous because the probability of pedestrian impact with the A-pillars is greater adjacent the lower ends of the A-pillars, closer to the hood.

Also in a preferred embodiment, the actuator system comprises one or more pyrotechnic devices for generating gas pressure to drive a mechanical linkage connected to the A-pillar covers when the pyrotechnic is activated. The actuator system may comprise a contact sensor for detecting a pedestrian impact with a front section of the vehicle, and/or a remote sensor for detecting an impending pedestrian impact with a front section of the vehicle.

According to a feature of the invention, the A-pillar covers when in the deployed condition are deformable in response to a pedestrian impact, the deformation serving to absorb impact energy.

According to another feature of the invention, at least one damper is operatively connected with the A-pillar covers to provide controlled resistance to movement of the A-pillar covers from the deployed condition toward the retracted condition in order to absorb impact energy. The damper may be a separate component from the actuator mechanism, or may be integrated. with the actuator mechanism.

According to another feature of the invention, the hood of the vehicle may be provided with a hood deployment mechanism operative to move the hood to a raised position substantially simultaneously with movement of the A-pillar covers to the deployed condition. Raising the hood increases the amount of space between the hood and rigid objects in the engine compartment, such as the engine, battery, shock absorber mounts, etc. This additional "crush space" allows the hood to yield under impact of the pedestrian by an amount sufficient to absorb a significant amount of the impact energy, further deceasing the likelihood and/or severity of injury to the pedestrian.

According to another feature of the invention, the windshield moves along with the A-pillar covers to the deployed condition so that it is able to yield rearwardly along with A-pillar covers in order to absorb the impact energy of a pedestrian striking the windshield.

The invention also provides a method for lessening the degree of injury suffered by a pedestrian when struck by a motor vehicle, the method comprising the steps of predicting an impact of the pedestrian with the vehicle and moving a left A-pillar cover and a right A-pillar cover from a retracted condition to a deployed condition wherein the A-pillar covers are spaced forwardly from the respective A-pillars in order to absorb impact energy.

Other features and advantages of the present invention will be readily appreciated and better understood after reading the subsequent description when considered in connection with the accompanying drawings.

BRIEF DESCRIPTION OF DRAWINGS

FIG. 4 is a side view of a vehicle with A-pillar covers and a deployable hood.

FIG. 5 is a perspective view of a vehicle with A-pillar covers, a deployable hood, and a deployable windshield.

FIG. 6 is a partial cross-sectional view taken along line 6—6 in FIG. 5.

DETAILED DESCRIPTION

Figure 1:
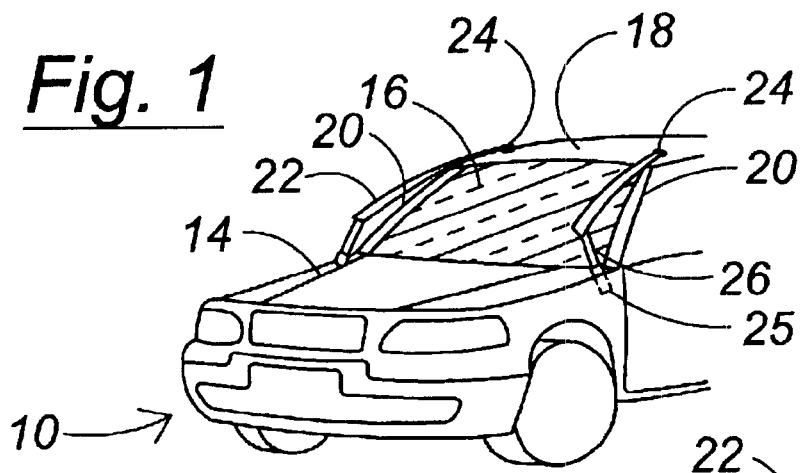
FIG. 1 is a perspective view of a vehicle with A-pillar covers according to the invention in a deployed condition.
Figure 3:
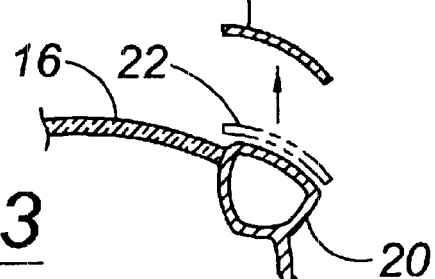
FIG. 3 is a partial cross-sectional view taken along line 3—3 in FIG. 2.
Figure 2:
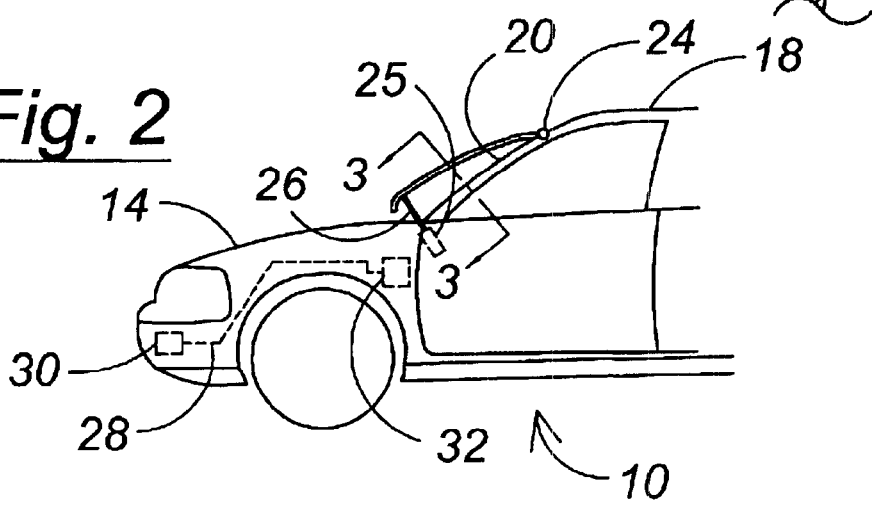
FIG. 2 is a side view of the vehicle of FIG. 1.

Referring to FIGS. 1–3, reference numeral 10 designates a motor vehicle having a hood 14, a windshield 16, a roof 18, and left and right A-pillars 20.

The vehicle 10 is equipped with left and right A-pillar covers 22 connected to the vehicle by hinges 24 preferably located adjacent the upper ends of the A-pillars 20.

The A-pillar covers 22 are movable about the hinges 24 between a retracted condition wherein the A-pillar covers lie closely against the A-pillars 20 (as shown in phantom lines in FIG. 3) to provide a unitary, integrated appearance, and a deployed condition wherein the A-pillar covers 22 rotate about hinges 24 so that the lower ends of the A-pillar covers move forward and upward with respect to the vehicle 10. The A-pillar covers 22 are preferably formed of a metal, plastic, or composite material.

Actuators 25 are disposed adjacent the lower ends of the A-pillars 20 and are operable to urge the A-pillar covers 22 to the deployed condition. Actuators 25 preferably comprise pyrotechnic devices in which a combustible material is burned to produce high-pressure gas that drives a piston (not shown). A rod 26 or other mechanical linkage connects the piston with the A-pillar cover 22 such that it urges the A-pillar cover to the deployed condition when the combustible material is ignited. Actuators 25 may, however, be powered by any appropriate power source, such as compressed gas, mechanical springs, hydraulic, magnetic or electric.

A control system 28 indicated schematically in FIG. 2 comprises a pedestrian impact sensor 30, which may detect physical impacts with the vehicle 10 or may be a pre-impact sensor utilizing, for example, radar, laser, sonar, optical, or any other appropriate remote detection means. An electronic control module 32 receives signals from sensor 30, evaluates the signals, and activates actuators 25 when the signals indicate that the vehicle 10 has struck or is about to strike a pedestrian. Other vehicle systems (the speedometer, for example) may also provide input signals to the control module.

During normal operation of the vehicle 10, A-pillar covers 22 are in the retracted condition wherein they lie closely against the forward-facing surfaces of A-pillars 20. When activated by control system 28 in response to an actual or predicted collision of the vehicle 10 with a pedestrian, actuators 25 urge A-pillar covers 22 to the deployed condition in which they are spaced from their respective A-pillars 20. When deployed, A-pillar covers 22 provide cushioning for any pedestrian (or other object) that would otherwise strike the A-pillars 20.

The impact cushioning may be achieved by making the A-pillar covers 22 relatively flexible and/or deformable, so that they yield under the force of the impact and thereby absorb impact energy. This flexibility and/or deformability is in contrast to the A-pillars 20, which must be extremely strong and rigid in order to contribute to the structural strength of the vehicle body. The flexibility/deformability may be achieved through proper selection of the material of which A-pillar covers 22 are formed, and/or by the shape and size of the cross-section of the A-pillar covers. The construction may vary over the length of the A-pillar covers 22 in order to achieve the desired mechanical characteristics for proper injury-prevention at all positions along the A-pillar covers.

Actuators 25 may be designed to serve an energy absorbing or damping function after they have urged the A-pillar covers 22 to the deployed condition. Such an integrated actuator/damper will absorb or dissipate impact energy by providing controlled resistance to movement of the A-pillar covers 22 rearward toward the retracted condition when struck by a pedestrian, thereby providing additional cushioning of the pedestrian impact. In the case of a pyrotechnic, hydraulic, or compressed gas actuator, for example, this may be accomplished by designing the actuators to maintain a proper amount of internal pressure after extension and/or by providing a controlled venting of pressure from the extended cylinder. Alternatively, dampers (not shown) may be provided that are separate from actuators 25. Dampers may be of any appropriate type, such as compressed gas, hydraulic, mechanical, or electrical.

Some accident data and laboratory studies have shown that the probability of pedestrian impact with the A-pillars 20 is greatest adjacent the lower ends of the A-pillars, close to hood 14. It is therefore advantageous for A-pillar covers 22 to pivot about their upper ends, since this configuration results in a greater distance for rearward travel adjacent the lower ends of the A-pillar covers, and thus a greater ability to absorb impact energy. An A-pillar cover that undergoes any type of rotational or translational movement in moving to a deployed condition is also within the scope of this invention, however.

In the embodiment of the invention shown in FIG. 4, vehicle 10 has deployable A-pillar covers 22 substantially as described above in combination with a deployable hood 36 that moves upwardly to a raised position in response to an actual or anticipated collision with a pedestrian. Deployment of the hood 36 to the raised position increases the amount of space between the hood and rigid, unyielding objects in the engine compartment, such as the engine, battery, shock absorber mounts, etc. This additional "crush space" allows the hood 36 to yield under impact of the pedestrian by an amount sufficient to absorb a significant amount of the impact energy, thus deceasing the likelihood and/or severity of injury to the pedestrian. Examples of hood deployment mechanisms are disclosed in co-pending U.S. patent application Ser. No. 09/682,983, "VEHICLE HOOD DEPLOYMENT DEVICE FOR PEDESTRIAN PROTECTION" and Ser. No. 09/682,986, "VEHICLE HOOD DEPLOYMENT DEVICE FOR PEDESTRIAN PROTECTION", the disclosures of which are incorporated herein by reference. The same sensors that trigger deployment of A-pillar covers 22 may be used to trigger deployment of the hood 14 or separate sensors may be used.

In the embodiment of the invention depicted in FIG. 4, the hood 36 rotates about a lateral axis adjacent a leading edge of the hood and actuators 38 act on hood 36 adjacent the outboard rear corners to urge the hood to the raised condition. Alternatively, a single actuator or set of actuators may be used to deploy both the hood 36 and the A-pillar covers 22. Hood 36 may also be provided with dampers (not shown) that absorb impact energy by allowing the hood to move downward when struck by a pedestrian.

FIGS. 5 and 6 depict a third embodiment of the invention in which A-pillar covers 40 constitute the forward cross-sectional portions of their respective A-pillars 42. Each A-pillar cover 40 includes a flange 44 supporting the windshield 16 along its outboard edge so that the windshield moves forward to a deployed condition along with the A-pillar covers. In the deployed condition the windshield 16 is able to move rearwardly along with A-pillar covers 40 in order to absorb the impact energy of a pedestrian striking the windshield 16. A deployable hood 36 may also operate in conjunction with the deployable windshield 16, as shown.

While the best modes for carrying out the invention have been described in detail, those familiar with the art to which this invention relates will recognize various alternative designs and embodiments for practicing the invention as defined by the appended claims.

What is claimed is:

1. A pedestrian protection apparatus for a motor vehicle having a hood, a windshield, and left and right A-pillars disposed adjacent left and right ends of the windshield respectively, the apparatus comprising:

a left A-pillar cover and a right A-pillar cover, the A-pillar covers having a retracted condition wherein they are in front of and adjacent the respective A-pillars, and are moveable in a longitudinal direction of the vehicle to a deployed condition wherein the A-pillar covers are directly in front of and spaced from the respective A-pillars; and an actuator system operative to move the A-pillar covers from the retracted condition to the deployed condition prior to a pedestrian impact with the A-pillar covers.

2. The apparatus according to claim 1 wherein upper ends of the A-pillar covers are hingingly attached to the respective A-pillars, the A-pillar covers rotating about the upper ends to move from the retracted condition to the deployed condition.

3. The apparatus according to claim 1 wherein the A-pillar covers when in the deployed condition are deformable in response to a pedestrian impact with the A-pillar covers, said deformation absorbing impact energy.

4. The apparatus according to claim 1 further comprising at least one damper operatively connected with the A-pillar covers to resist movement of the A-pillar covers from the deployed condition toward the retracted condition in order to absorb impact energy.

5. The apparatus according to claim 1 wherein the actuator system comprises a pyrotechnic device for generating gas pressure that urges the A-pillar covers to the deployed condition.

6. The apparatus according to claim 1 wherein the actuator system comprises a contact sensor for detecting a pedestrian impact with a front section of the vehicle.

7. The apparatus according to claim 1 wherein the actuator system comprises a remote sensor for detecting an impending pedestrian impact with a front section of the vehicle.

8. The apparatus according to claim 1 further comprising a hood deployment mechanism operative to move the hood to a raised position substantially simultaneously with movement of the A-pillar covers to the deployed condition.

9. The apparatus according to claim 1 wherein the windshield moves along with the A-pillar covers to the deployed condition.

10. A pedestrian protection apparatus for a motor vehicle having a hood, a windshield, and left and right A-pillars disposed adjacent left and right ends of the windshield respectively, the apparatus comprising:

a left A-pillar cover and a right A-pillar cover, the A-pillar covers having a retracted condition wherein they are adjacent the respective A-pillars, and movable to a deployed condition wherein the A-pillar covers are spaced forwardly from the respective A-pillars;

an actuator system operative to move the A-pillar covers from the retracted condition to the deployed condition prior to a pedestrian impact with the A-pillar covers;

at least one damper operatively connected with the A-pillar covers to resist movement of the A-pillar covers from the deployed condition toward the retracted condition in order to absorb impact energy.

11. A method of lessening the degree of injury suffered by a pedestrian when struck by a motor vehicle having a hood, a windshield, and left and right A-pillars disposed adjacent left and right ends of the windshield respectively, the method comprising the steps of:

predicting an impact of the pedestrian with the vehicle; and moving a left A-pillar cover and a right A-pillar cover in a longitudinal direction of the vehicle from a retracted position wherein the A-pillar covers are in front of and adjacent the respective A-pillars to a deployed condition wherein the A-pillar covers are directly in front of and spaced from the respective A-pillars.

12. The method according to claim 11 wherein the step of moving the A-pillar covers from the retracted condition to the deployed condition comprises rotating the A-pillar covers about hinges attaching upper ends of the A-pillar covers to the A-pillars.

13. The method according to claim 11 further comprising the step of allowing the A-pillar covers when in the deployed condition to deform when struck by a pedestrian.

14. The method according to claim 11 further comprising the step of allowing movement of the A-pillar covers from the deployed condition toward the retracted condition when struck by the pedestrian, said movement absorbing impact energy.

15. The method according to claim 14 wherein the step of allowing movement of the A-pillar covers toward the retracted condition involves at least one damper providing resistance to the movement of the A-pillar covers toward the retracted condition.

16. The method according to claim 11 wherein the step of moving the A-pillar covers from the retracted condition to the deployed condition comprising activating a pyrotechnic device to generate gas pressure that urges the A-pillar covers to the deployed condition.

17. The method according to claim 11 wherein the step of predicting the impact is accomplished by a contact sensor for detecting a pedestrian impact with a front section of the vehicle.

18. The method according to claim 11 wherein the step of predicting the impact is accomplished by a remote sensor for detecting an impending pedestrian impact with a front section of the vehicle.

19. The method according to claim 11 further comprising the step of moving the hood to a raised position substantially simultaneously with movement of the A-pillar covers to the deployed condition.

20. The method according to claim 11 further comprising the step of moving the windshield along with the A-pillar covers to the deployed condition.

* * * * *